US009450657B2

(12) United States Patent
Yue et al.

(10) Patent No.: US 9,450,657 B2
(45) Date of Patent: Sep. 20, 2016

(54) LOW-COMPLEXITY PRECODER DESIGN FOR LARGE-SCALE MIMO COMMUNICATION SYSTEMS

(71) Applicant: NEC Laboratories America, Inc., Princeton, NJ (US)

(72) Inventors: Guosen Yue, Edison, NJ (US); Narayan Prasad, Wyncote, PA (US); Sampath Rangarajan, Bridgewater, NJ (US); Samet Oymak, Plainsboro, NJ (US)

(73) Assignee: NEC Corporation (JP)

(*) Notice: Subject to any disclaimer, the term of this patent is extended or adjusted under 35 U.S.C. 154(b) by 166 days.

(21) Appl. No.: 14/465,053

(22) Filed: Aug. 21, 2014

(65) Prior Publication Data

US 2015/0063254 A1    Mar. 5, 2015

Related U.S. Application Data

(60) Provisional application No. 61/870,887, filed on Aug. 28, 2013.

(51) Int. Cl.
| H04L 1/06 | (2006.01) |
| H04L 5/00 | (2006.01) |
| H04W 72/04 | (2009.01) |
| H04B 7/04 | (2006.01) |

(52) U.S. Cl.
CPC .......... *H04B 7/0465* (2013.01); *H04B 7/0469* (2013.01); *H04L 5/0037* (2013.01); *H04B 7/0439* (2013.01); *H04B 7/0443* (2013.01)

(58) Field of Classification Search
None
See application file for complete search history.

(56) References Cited

U.S. PATENT DOCUMENTS

| 2008/0080632 A1* | 4/2008 | Kim ..................... H04L 1/0687 375/267 |
| 2012/0069928 A1* | 3/2012 | Jose ..................... H04B 7/0456 375/285 |
| 2012/0087265 A1* | 4/2012 | Tamaki .................. H01Q 1/246 370/252 |
| 2012/0243631 A1* | 9/2012 | Gaur .................... H04B 7/0447 375/267 |
| 2012/0275313 A1* | 11/2012 | Prasad ................ H04B 7/0417 370/241 |

* cited by examiner

*Primary Examiner* — Kevin C Harper
*Assistant Examiner* — Derrick V Rose
(74) *Attorney, Agent, or Firm* — Joseph Kolodka

(57) ABSTRACT

A method and system are provided. The method includes providing transmit precoders for a multiple-input and multiple-output communication system having a plurality of transmit antennas. The plurality of transmit antennas are for forming, using precoding, a plurality of channels such that each of the plurality of channels are configurable to serve a respective one of a plurality of users. The providing step includes imposing a respective average transmit antenna power constraint on each of the plurality of transmit antennas. The providing step further includes determining a diagonal precoder responsive to applying column scaling to a downlink channel matrix having a plurality of rows and a plurality of columns. The providing step additionally includes generating, from the diagonal precoder, a weighted precoder in accordance with the respective average antenna power constraint by optimizing a weighted sum-rate obtained upon transmitting respective signals over the plurality of channels.

16 Claims, 3 Drawing Sheets

LOW-COMPLEXITY PRECODER DESIGN FOR LARGE-SCALE MIMO COMMUNICATION SYSTEMS

RELATED APPLICATION INFORMATION

This application claims priority to provisional application Ser. No. 61/870,887 filed on Aug. 28, 2013, incorporated herein by reference.

BACKGROUND

1. Technical Field

The present invention relates to signal processing, and more particularly to a low complexity precoder design for large scale multiple-input and multiple-output (MIMO) communication systems.

2. Description of the Related Art

Multiple antenna systems, a.k.a., multiple-input multiple-output (MIMO) systems, have been an important solution for improving system throughput in the new generation high-speed wireless and cellular systems. The MIMO technique has been adopted in 3GPP Long Term Evolution (LTE) systems, which are being currently deployed worldwide. To further improve MIMO channel gain, transmission with eight transmit antennas is supported in the LTE Advanced (LTE-A) standard (3GPP LTE Release 10) with up-to eight data transmission layers for single user (SU) MIMO. However, it is difficult to equip such a large number of antennas at the user terminal end, particularly, on smartphones, which makes the realization of the large spatial multiplexing gain less attractive to the wireless vendors. On the other hand, multi-user MIMO with linear precoding has been included in the LTE-A standard to further enhance system capacity. By serving multiple users on the same channel resources, high order MIMO can be virtually realized even with one receive antenna for each user due to the uncorrelated channel among users.

Recently, MIMO systems employing a large number of transmit antennas, e.g., tens or more than one hundred, draw increasing interest. These systems are often referred to as large-scale MIMO or massive MIMO. It has been shown that when supporting multiuser MIMO transmission with the transmit antennas in a large scale, the intra-cell interference among co-scheduled users vanishes due to uncorrelated channel and precoding matrices. Consequently, the network capacity can be significantly improved. One condition here for interference suppression utilizing precoding with a large number of transmit antennas is perfect knowledge of the channel information at the base station for all served users, which can be assumed in time-division duplex (TDD) systems. When the number of transmit antennas is in a higher order than the number of users, the system capacity is then scaled by the number of users. Moreover, matched filter based precoding and a linear receiver can be sufficient in large-scale MIMO systems, resulting in significantly low complexity of the signal processing at both the transmitter and receiver. Due to the throughput and complexity advantages, large-scale MIMO becomes more and more attractive given the current situation of sparse available spectrum and exponentially increasing wireless data demands.

Although match filter based precoding can perform fine in a large-scale MIMO system, with the antenna power constraints, the performance can be degraded when the transmitter has to scale the precoded signals among all transmit antennas to avoid signal distortions caused by amplifier limitations.

SUMMARY

These and other drawbacks and disadvantages of the prior art are addressed by the present principles, which are directed to a low complexity precoder design for large scale multiple-input and multiple-output (MIMO) communication systems.

According to an aspect of the present principles, a method is provided. The method includes providing transmit precoders for a multiple-input and multiple-output communication system having a plurality of transmit antennas. The plurality of transmit antennas are for forming, using precoding, a plurality of channels such that each of the plurality of channels are configurable to serve a respective one of a plurality of users. The providing step includes imposing a respective average transmit antenna power constraint on each of the plurality of transmit antennas. The providing step further includes determining a diagonal precoder responsive to applying column scaling to a downlink channel matrix having a plurality of rows and a plurality of columns. The providing step additionally includes generating, from the diagonal precoder, a weighted precoder in accordance with the respective average antenna power constraint by optimizing a weighted sum-rate obtained upon transmitting respective signals over the plurality of channels.

According to another aspect of the present principles, a computer readable storage medium is provided. The computer readable storage medium includes a computer readable program for performing a method. The computer readable program when executed on a computer causes the computer to perform the following method. The method includes providing transmit precoders for a multiple-input and multiple-output communication system having a plurality of transmit antennas. The plurality of transmit antennas are for forming, using precoding, a plurality of channels such that each of the plurality of channels are configurable to serve a respective one of a plurality of users. The providing step includes imposing a respective average transmit antenna power constraint on each of the plurality of transmit antennas. The providing step further includes determining a diagonal precoder responsive to applying column scaling to a downlink channel matrix having a plurality of rows and a plurality of columns. The providing step additionally includes generating, from the diagonal precoder, a weighted precoder in accordance with the respective average antenna power constraint by optimizing a weighted sum-rate obtained upon transmitting respective signals over the plurality of channels.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to a low complexity precoder design for large scale multiple-input and multiple-output (MIMO) communication systems.

In an embodiment, we first propose a specific precoding structure, called a diagonal precoder, formed by the downlink channel matrix with column scaling. Based on this coding structure, we first present a precoder design using water filling. Then we propose a stochastic pairwise bisection search algorithm. To take into account multiuser interference, we present an efficient algorithm to obtain the zero-forcing precoders.

Advantageously, the present principles can be used in practical scenarios including, but not limited to, unequal weighted sum-rate maximization, users with different geometries, and so forth.

Figure 1:
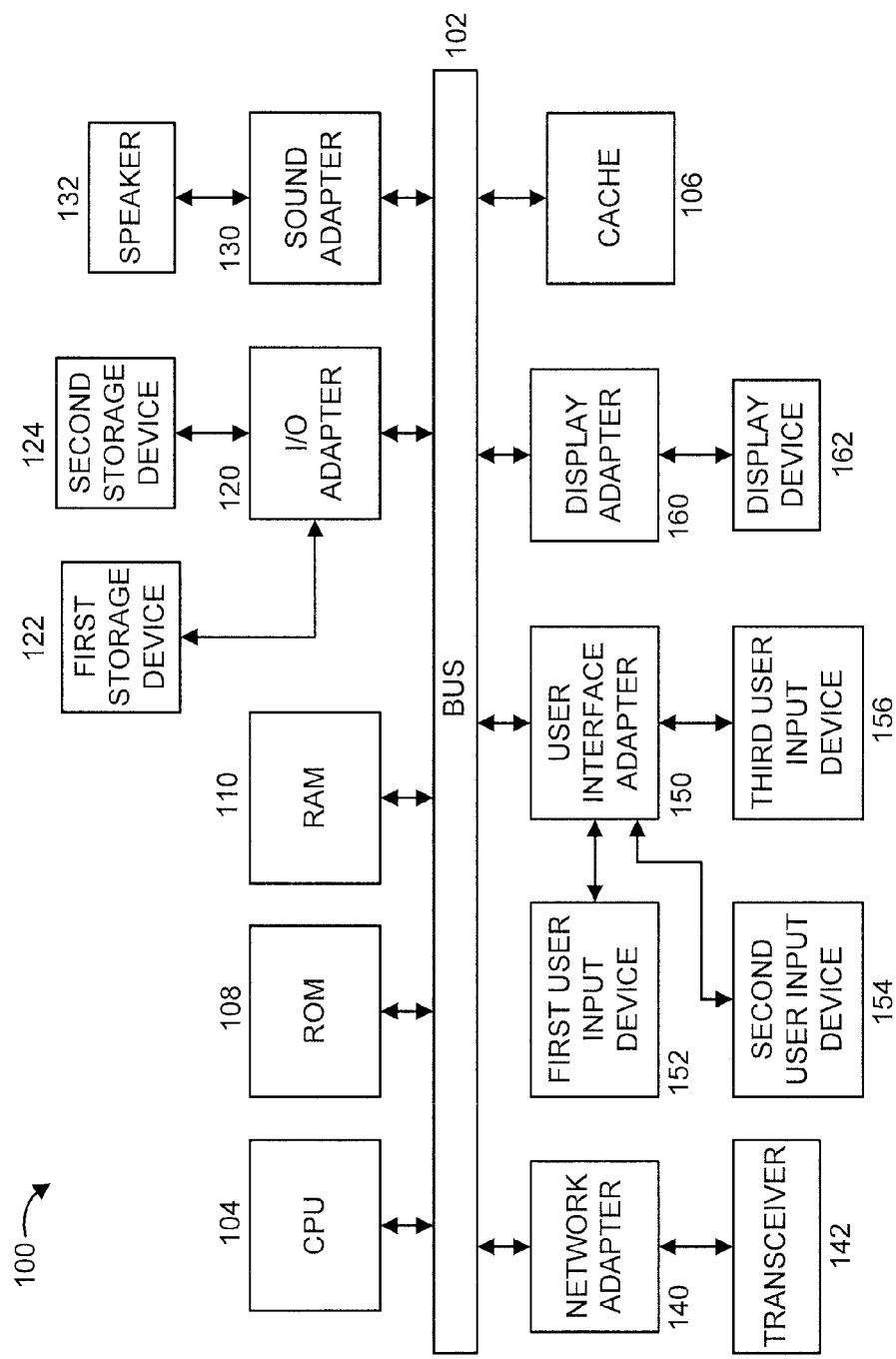
FIG. 1 is a block diagram showing an exemplary processing system 100 to which the present principles may be applied, according to an embodiment of the present principles.

FIG. 1 is a block diagram showing an exemplary processing system 100 to which the present principles may be applied, according to an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operative coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
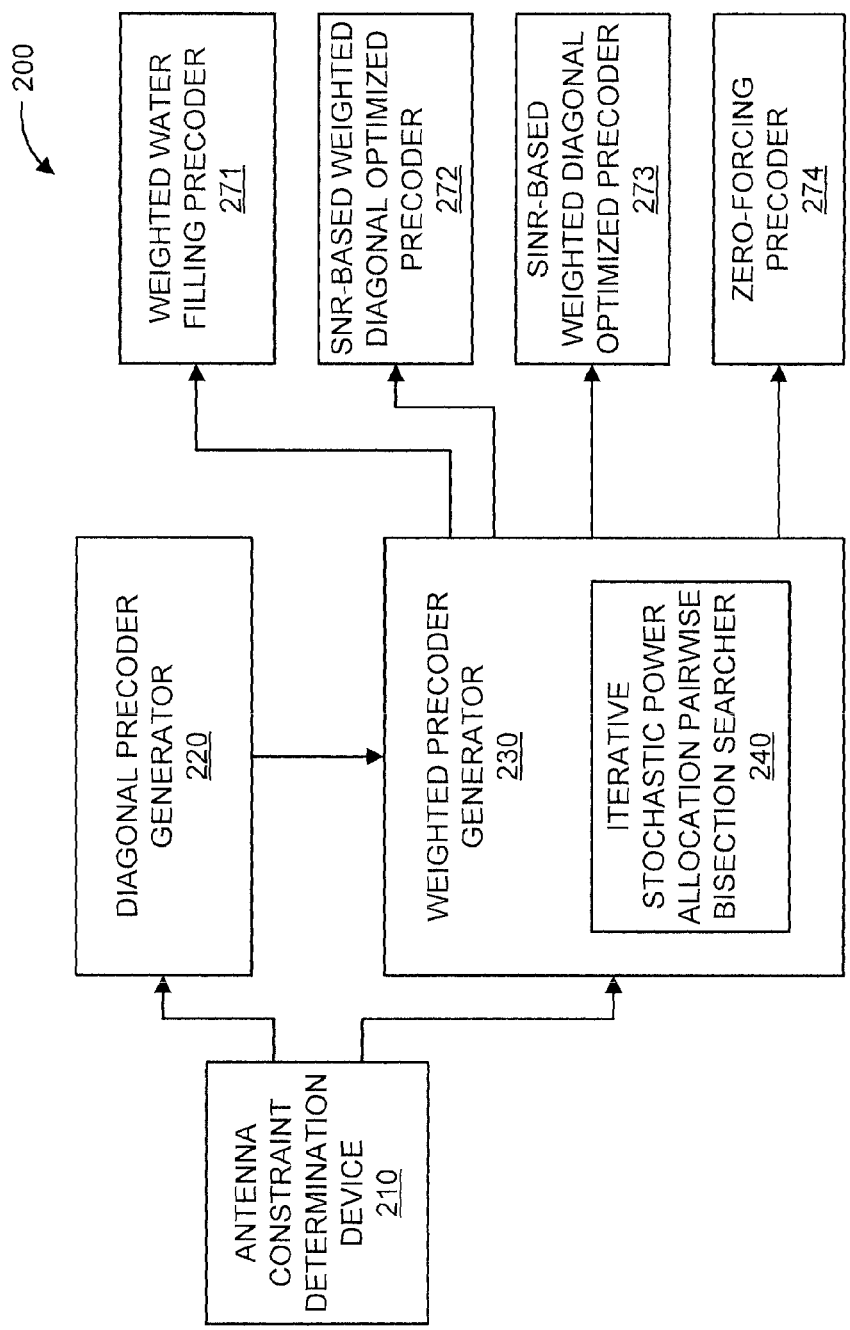
FIG. 2 shows an exemplary system 200 for generating a precoder for a large scale multiple-input and multiple-output (MIMO) communication system, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
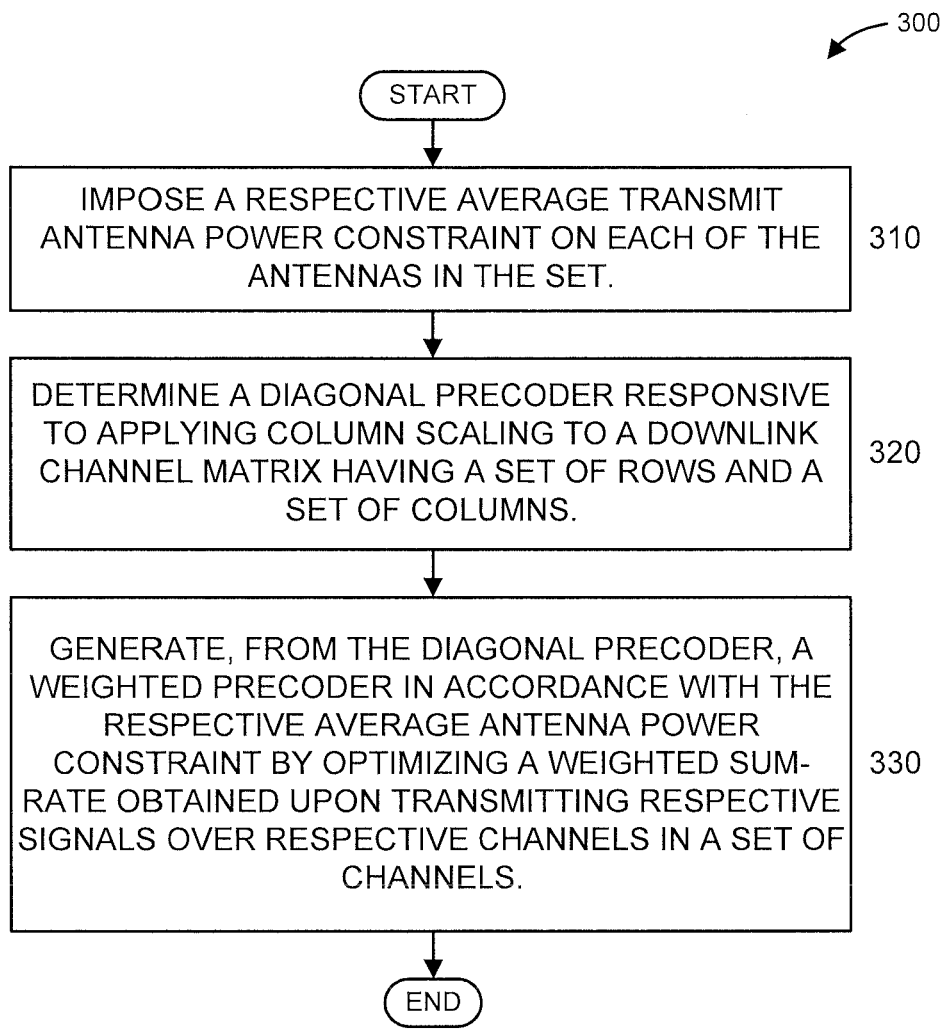
FIG. 3 shows an exemplary method 300 for generating a precoder for a large scale multiple-input and multiple-output (MIMO) communication system, in accordance with an embodiment of the present principles.

Further, it is to be appreciated that processing system 100 may perform at least part of the method described herein including, for example, at least part of method 300 of FIG. 3. Similarly, part or all of system 200 may be used to perform at least part of method 300 of FIG. 3.

FIG. 2 shows an exemplary system 200 for generating a precoder for a large scale multiple-input and multiple-output (MIMO) communication system, in accordance with an embodiment of the present principles. In the embodiment of FIG. 2, the communication system 200 has a set of transmit antennas. The antennas in that set can be used to create, via precoding, a set of channels such that each respective channel from that set of channels can be used simultaneously for serving a respective user from a set of users.

The system 200 includes an antenna constraint determination device 210, a diagonal precoder generator 220, and a weighted precoder generator 230. The weighted precoder generator 230 includes an iterative stochastic power allocation pairwise bisection searcher 240.

The antenna constraint determination device 210 imposes a respective average transmit antenna power constraint on each of the plurality of transmit antennas.

The diagonal precoder generator 220 generates a diagonal precoder responsive to applying column scaling to a downlink channel matrix. The downlink channel matrix includes coefficients indicating the state (parameters) of the downlink channel.

The weighted precoder generator 230 generates, from the diagonal precoder, a weighted water filling based precoder by optimizing a weighted sum-rate obtained upon transmitting respective signals over respective channels in the set of channels in accordance with the respective average antenna power constraint.

The weighted precoder generator 230 can generate any of a weighted water filling precoder 271, an SNR-based weighted diagonal optimized precoder 272, a SINR-based weighted diagonal optimized precoder 273, and a zero-forcing precoder 274. Since SINR-based weighted diagonal optimized precoder 272 optimizes the SINR-based weighted sum-rate, the SINR-based weighted diagonal optimized precoder 272 also accounts for the mutual interference among the set of channels, which the zero-forcing precoder seeks to eliminate. In an embodiment, zero-forcing precoder 274 can be obtained from any of the weighted water filling precoder 271, the SNR-based weighted diagonal optimized precoder 272, and the SINR-based weighted diagonal optimized precoder 273.

FIG. 3 shows an exemplary method 300 for generating a precoder for a large scale multiple-input and multiple-output (MIMO) communication system, in accordance with an embodiment of the present principles. In the embodiment of FIG. 3, the corresponding communication system has a set of transmit antennas. The antennas in that set can be used to create, via precoding, a set of channels such that each respective channel from that set of channels can be used simultaneously to serve a respective user from a set of users.

At step 310, impose a respective average transmit antenna power constraint on each of the transmit antennas in the set.

At step 320, determine a diagonal precoder responsive to applying column scaling to a downlink channel matrix having a set of rows and a set of columns.

At step 330, generate, from the diagonal precoder, a weighted precoder in accordance with the respective average antenna power constraint, by optimizing a weighted sum-rate obtained upon transmitting respective signals over respective channels in a set of channels, where the set of channels is created by employing precoding over the set of transmit antennas. In an embodiment, the weights can correspond to, for example, user priorities, user qualities of service, and so forth. It is to be appreciated that step 330 can generate any of the precoders 271 through 274 shown and described with respect to at least FIG. 2.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method, comprising:
providing transmit precoders for a multiple-input and multiple-output communication system having a plurality of transmit antennas, the plurality of transmit antennas for forming, using precoding, a plurality of channels such that each of the plurality of channels are configurable to serve a respective one of a plurality of users,
wherein said providing step comprises:
imposing a respective average transmit antenna power constraint on each of the plurality of transmit antennas;
determining a diagonal precoder responsive to applying column scaling to a downlink channel matrix having a plurality of rows and a plurality of columns; and
generating, from the diagonal precoder, a weighted precoder in accordance with the respective average antenna power constraint by:
optimizing a weighted sum-rate obtained upon transmitting respective signals over the plurality of channels; and
performing an iterative stochastic power allocation pairwise bisection search, wherein the iterative stochastic power allocation pairwise bisection search includes, for each of a plurality of iterations, randomly selecting two users from among the plurality of users and locally allocating power between the two users to maximize an objective function for determining the optimal weighted sum-rate.

2. The method of claim 1, wherein the objective function is determined responsive to a signal-to-noise ratio.

3. The method of claim 1, wherein the objective function is determined responsive to a signal-to-interference-plus-noise ratio.

4. The method of claim 1, wherein at least one of the two users is changed for each of the plurality of iterations.

5. The method of claim 1, wherein the objective function is maximized subsequent to row normalization of the downlink channel matrix.

6. The method of claim 1, wherein the diagonal precoders are determined further responsive to row normalization of the downlink channel matrix.

7. The method of claim 1, wherein the respective weighted precoder is a water-filling precoder generated responsive to a water filling technique.

8. The method of claim 1, wherein the respective weighted precoder is a zero-forcing precoder.

9. The method of claim 1, wherein weights used to compute the weighted sum rate are different for different ones of the plurality of users.

10. The method of claim 1, wherein the downlink channel matrix is a composite channel matrix determined for the plurality of transmit antennas and the plurality of users.

11. The method of claim 1, further comprising transmitting the respective signal over the respective one of the plurality of channels in accordance with the optimal weighted sum-rate and the respective average antenna power constraint.

12. A non-transitory computer readable storage medium comprising a computer readable program for performing a method, wherein the computer readable program when executed on a computer causes the computer to perform the method steps of:

providing transmit precoders for a multiple-input and multiple-output communication system having a plurality of transmit antennas, the plurality of transmit antennas for forming, using precoding, a plurality of channels such that each of the plurality of channels are configurable to serve a respective one of a plurality of users, wherein said providing step comprises:

imposing a respective average transmit antenna power constraint on each of the plurality of transmit antennas;

determining a diagonal precoder responsive to applying column scaling to a downlink channel matrix having a plurality of rows and a plurality of columns; and generating, from the diagonal precoder, a weighted precoder in accordance with the respective average antenna power constraint by;

optimizing a weighted sum-rate obtained upon transmitting respective signals over the plurality of channels; and performing an iterative stochastic power allocation pairwise bisection search, wherein the iterative stochastic power allocation pairwise bisection search includes, for each of a plurality of iterations, randomly selecting two users from among the plurality of users and locally allocating power between the two users to maximize an objective function for determining the optimal weighted sum-rate.

13. The computer readable storage medium of claim 12, wherein the objective function is determined responsive to a signal-to-noise ratio.

14. The computer readable storage medium of claim 12, wherein the objective function is determined responsive to a signal-to-interference-plus-noise ratio.

15. The computer readable storage medium of claim 12, wherein the respective weighted precoder is a water-filling precoder generated responsive to a water filling technique.

16. The computer readable storage medium of claim 12, wherein weights used to compute the weighted sum rate are different for different ones of the plurality of users.

* * * * *